US012629992B2

(12) United States Patent
Laperriere et al.

(10) Patent No.: US 12,629,992 B2
(45) Date of Patent: May 19, 2026

(54) VEHICLE HAVING A DRIVING CAB EQUIPPED WITH A SHADING DEVICE

(71) Applicant: Volvo Truck Corporation, Gothenburg (SE)

(72) Inventors: Renaud Laperriere, Lyons (FR); Philemon Chavrier, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 313 days.

(21) Appl. No.: 18/466,079

(22) Filed: Sep. 13, 2023

(65) Prior Publication Data

US 2024/0100916 A1 Mar. 28, 2024

(30) Foreign Application Priority Data

Sep. 20, 2022 (EP) ..................................... 22196708

(51) Int. Cl.
*B60J 1/20* (2006.01)
*B60R 1/22* (2022.01)
*E06B 9/40* (2006.01)

(52) U.S. Cl.
CPC ............. *B60J 1/205* (2013.01); *B60J 1/2077* (2013.01); *B60R 1/22* (2022.01); *E06B 9/40* (2013.01)

(58) Field of Classification Search
CPC ...... B60J 1/2077; B60J 1/2069; B60J 1/2041; B60J 1/205; E06B 2009/405; E06B 2009/2458; B60R 1/22
See application file for complete search history.

(56) References Cited

U.S. PATENT DOCUMENTS

| | | | |
|---|---|---|---|
| 2,922,676 A | 1/1960 | Czajkowski | |
| 5,101,878 A * | 4/1992 | Thomas ................... | E06B 9/40 |
| | | | 160/370.22 |

(Continued)

FOREIGN PATENT DOCUMENTS

| | | | |
|---|---|---|---|
| DE | 102005032043 A1 | 1/2007 | |
| EP | 1705042 A2 * | 9/2006 | ............. E06B 9/262 |

(Continued)

OTHER PUBLICATIONS

EP 1705042 machine translation (Year: 2006).*
European Search Report for European Patent Application No. 22196708.6, completed Feb. 28, 2023, 2 pages.

*Primary Examiner* — Abe Massad
(74) *Attorney, Agent, or Firm* — Withrow & Terranova, PLLC

(57) ABSTRACT

The vehicle comprises a shading device arranged inside the driving cab. The shading device comprises a main curtain and a first side curtain, which are separate from each other but carried by common shaft, rotatable relative to a chassis, and which are each kinematically linked to the shaft. The vehicle further comprises a camera monitoring system capturing images outside the driving cab, and a first display screen arranged inside the driving cab, positioned on first one of the two lateral sides of the windshield, and vertically aligned with first side curtain but offset from main curtain. The shading device is configured to change between a first configuration, in which the main curtain and the first side curtain are entirely disposed higher than top of the first display screen, and a second configuration, in which a portion of the main curtain is disposed lower than top of the first display screen.

12 Claims, 5 Drawing Sheets

(56)        References Cited

U.S. PATENT DOCUMENTS

| | | | | |
|---|---|---|---|---|
| 5,135,279 | A | 8/1992 | Beatty | |
| 6,227,601 | B1 * | 5/2001 | LaFrance | B60J 1/2011 |
| | | | | 296/97.4 |
| 6,460,593 | B1 * | 10/2002 | Floyd | E06B 9/40 |
| | | | | 296/97.7 |
| 7,240,716 | B2 * | 7/2007 | Nichols, Jr. | E06B 9/40 |
| | | | | 160/310 |
| 10,093,155 | B2 * | 10/2018 | Tisdale | B60J 1/2041 |
| 11,724,574 | B2 * | 8/2023 | Berne | B60J 1/2011 |
| | | | | 348/148 |
| 12,065,080 | B2 * | 8/2024 | Berne | B60R 1/26 |
| 2002/0069980 | A1 | 6/2002 | Floyd | |
| 2011/0042016 | A1 * | 2/2011 | Demma | B60J 7/0015 |
| | | | | 160/98 |
| 2017/0013188 | A1 * | 1/2017 | Kothari | B60R 11/0235 |
| 2020/0290437 | A1 * | 9/2020 | Manatpon | B60J 7/0015 |

FOREIGN PATENT DOCUMENTS

| | | | |
|---|---|---|---|
| EP | 3929009 | A1 | 12/2021 |
| WO | 2020098903 | A1 | 5/2020 |

\* cited by examiner

VEHICLE HAVING A DRIVING CAB EQUIPPED WITH A SHADING DEVICE

RELATED APPLICATIONS

The present application claims priority to European Patent Application No. 22196708.6, filed on Sep. 20, 2022, and entitled "VEHICLE HAVING A DRIVING CAB EQUIPPED WITH A SHADING DEVICE," which is incorporated herein by reference in its entirety.

TECHNICAL FIELD

The disclosure relates generally to a vehicle. In particular aspects, the disclosure relates to a vehicle having a driving cab equipped with a shading device.

The disclosure can be applied in heavy-duty vehicles, such as trucks, buses, and construction equipment. Although the disclosure will be described with respect to a particular vehicle, the disclosure is not restricted to any particular vehicle.

BACKGROUND

The driver of a vehicle is usually seated at a driving position at the front of the vehicle. For heavy-duty vehicles, the driving position is usually provided in a driving cab with a windshield at the front of the chassis of the cab.

In order to protect the driver and, if necessary, one or more passengers from the sun's rays and, more generally, from the external light rays passing through the windshield, the cab is often equipped with a shading device inside. This shading device often includes a curtain, which extends horizontally over the entire length of the windshield and which can be moved along the windshield selectively downwards by unwinding from a winding shaft and upwards by winding around this shaft.

In order to assist the driver in driving the vehicle, the cab may be equipped internally with display screens belonging to a camera monitoring system. These screens display images of outside of the cab, captured by one or more cameras of the camera monitoring system. These display screens can replace the traditional optical mirrors: one of these display screens is positioned on the left side of the windshield while another display screen is positioned on the right side of the windshield. The presence of these display screens on the left and right sides of the windshield makes it necessary to limit the horizontal extent of the aforementioned curtain to avoid the possibility that, when the curtain is lowered too far, the left and right side parts of the curtain cover the display screens and thus hide them from the driver, which would obviously be unacceptable from a safety point of view. However, as the curtain has to be shortened horizontally, its shading function is impaired in the sense that the curtain allows the outside light rays passing through the windshield to pass around the display screens. The driver and, if applicable, the passenger(s) may be bothered.

SUMMARY

Therefore, there is a need to provide an improved solution for reconciling the presence of side-mounted display screens in a vehicle cab with good shading.

According to an aspect of the disclosure, a vehicle comprises a driving cab, which is arranged in front of the vehicle and which comprises a chassis, a windshield, and a shading device, which is arranged inside the driving cab and which shades external light rays passing through the windshield, the shading device comprising a main curtain and a first side curtain, which are separate from each other but carried by a common shaft, rotatable relative to the chassis, and which are each kinematically linked to the shaft so as to be jointly moved along the windshield selectively downwardly by unwinding from the shaft and upwardly by winding about the shaft. The vehicle also comprises a camera monitoring system that includes at least one camera configured to capture images of outside the driving cab, and a first display screen configured to display the images captured by said at least one camera, the first display screen being arranged inside the driving cab, being positioned on a first one of the two lateral sides, respectively left and right, of the windshield, and being vertically aligned with the first side curtain but offset from the main curtain. The shading device is configured to change between a first configuration, in which the main curtain and the first side curtain are entirely disposed higher than a top of the first display screen, and a second configuration in which a portion of the main curtain is disposed lower than the top of the first display screen without the first side curtain covering the first display screen.

According to an aspect of the disclosure, an object is achieved by an inventive concept disclosed herein. Hereby, a technical effect includes, by means of the joint displacement of the main curtain and the first side curtain upwards and downwards along the windshield, to be able to shading all or part of the windshield over the whole horizontal extent of the windshield between its left and right lateral sides, including its lateral region located plumb with, i.e. vertically above, the first display screen, without the first display screen being hided, in particular by the first side curtain. This technical effect is due to the fact that not only one curtain is used, but that the upwardly and downwardly movable, shading part of the shading device is divided into several curtains, i.e. at least the main curtain and the first side curtain, which, although separate from each other, are carried by the same rotating shaft so that they can be moved together along the windshield by means of their joint unwinding/winding. As a result, the first display screen remains uncovered and therefore visible to the driver of the vehicle, whatever the deployment configuration of the shading device, i.e. whatever the state of unwinding/winding of the main curtain and the first side curtain, this state of unwinding/winding being common to the main curtain and the first side curtain. At the same time, with sufficient unwinding of the main curtain and the first side curtain, the lateral region of the windshield located plumb with the first display screen is covered and thus shaded by the first side curtain, and this up to the top of the first display screen, while the main curtain covers and thus shades a central region of the windshield, outside of which the first display screen is positioned on the windshield and which is distinct from the lateral region of the windshield located plumb with the first display screen.

In certain examples, the first side curtain includes an end portion, which is unwound before the rest of the first side curtain when unwinding the first side curtain from the shaft and which is wound after the rest of the first side curtain when winding the first side curtain about the shaft, and the end portion of the first side curtain is accordion-shaped so as to be unfolded when the shading device is in the first configuration and to be at least partially folded on itself at the top of the first display screen when the shading device is in the second configuration. Hereby, the shading device is reliable and simple to implement.

In certain examples, the end portion of the first side curtain is provided with a mechanical stop which cooperates by contact with a bearing piece with which the first display screen is provided so as to keep the end portion of the first side curtain in position at the top of the first display screen when the shading device is in the second configuration. Hereby, the stability of the folded end portion of the first side curtain at the top of the first side display screen is enhanced.

In certain examples, the mechanical stop and the bearing piece cooperate magnetically. Hereby, the implementation of this solution is very simple and practical.

In certain examples, the first side curtain includes an end portion, which is unwound before the rest of the first side curtain when unwinding the first side curtain from the shaft and which is wound after the rest of the first side curtain when winding the first side curtain about the shaft, and the shading device includes a first guide member that contact-guides the end portion of the first side curtain toward backside of the first display screen when the shading device is changed from the first to the second configuration. Hereby, the shading device is reliable and simple to implement.

In certain examples, the guide member includes a ramp that is disposed vertically above the first display screen and slopes downwardly between a first end of the ramp facing away from the windshield and a second end of the ramp facing the windshield. Hereby, the guidance of the end portion of the first side curtain by this ramp is efficient and reliable.

In certain examples, the guide member is carried by the first display screen. Hereby, the implementation of this solution is very simple and practical.

In certain examples, a side edge of the main curtain facing the first side curtain and a side edge of the first side curtain facing the main curtain overlap without being directly attached to each other. Hereby, the main curtain and the first side curtain provide continuous shading between them.

In certain examples, the main curtain extends, along the shaft, to a greater extent than the first side curtain. Hereby, the dimensioning of the curtains is thus adapted to the usual relative dimensioning between the windshield and the first display screen.

In certain examples, the shading device further comprises a second side curtain, which is carried by the shaft and which is kinematically linked to the shaft so as to be moved together with the main curtain and the first side curtain selectively downwardly by unwinding from the shaft and upwardly by winding about the shaft. The camera monitoring system further comprises a second display screen configured to display the images captured by said at least one camera, the second display screen being arranged inside the driving cab, being positioned on the second lateral side of the windshield, and being vertically aligned with the second side curtain but offset from the main curtain. When the shading device is in the first configuration, the main curtain and the first and second side curtains are entirely disposed higher than the tops of the first and second display screens. When the shading device is in the second configuration, said portion of the main curtain is disposed lower than the top of the second display screen without the second side curtain covering the second display screen. Hereby, the solution is easily adapted to the frequent case where there is a display screen on the left side of the windshield and another display screen on the right side of the windshield.

In certain examples, the second side curtain includes an end portion, which is unwound before the rest of the second side curtain when unwinding the second side curtain from the shaft and which is wound after the rest of the second side curtain when winding the second side curtain about the shaft, and the end portion of the second side curtain is accordion-shaped so as to be unfolded when the shading device is in the first configuration and to be at least partially folded on itself at the top of the second display screen when the shading device is in the second configuration. Hereby, the shading device is reliable and simple to implement.

In certain examples, the second side curtain includes an end portion, which is unwound before the rest of the second side curtain when unwinding the second side curtain from the shaft and which is wound after the rest of the second side curtain when winding the second side curtain about the shaft, and the shading device includes a second guide member that contact-guides the end portion of the second side curtain toward backside of the second display screen when the shading device changes from the first to the second configuration. Hereby, the shading device is reliable and simple to implement.

Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

With reference to the appended drawings, below follows a more detailed description of aspects of the disclosure cited as examples.

FIG. 1 shows a truck 1.

Figure 1:
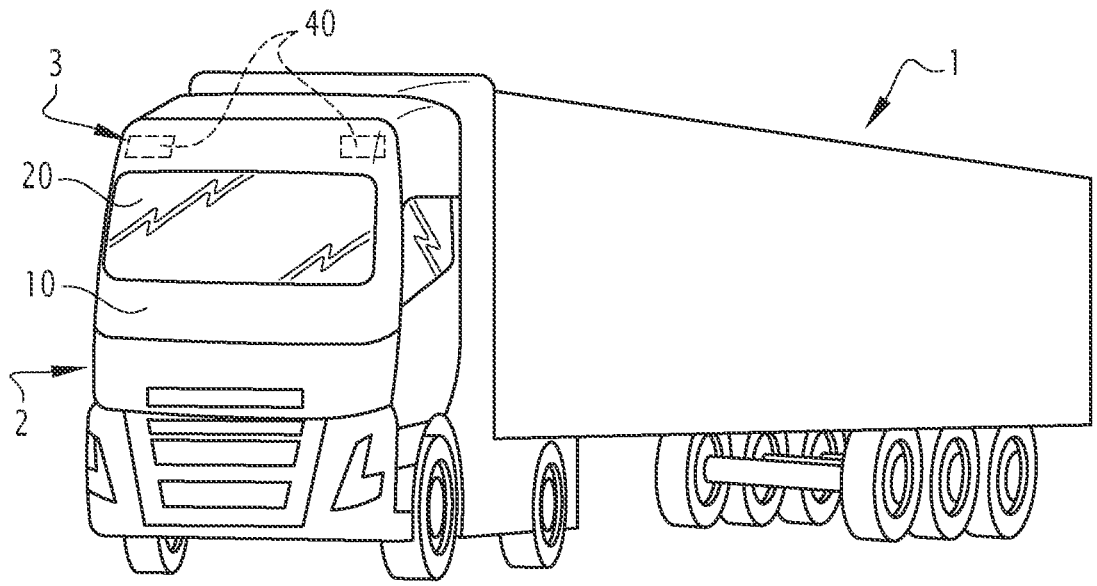
FIG. 1 is a perspective view of a vehicle according to one example.

The remainder of the description is oriented by considering that the term "vertical" refers to a direction that is perpendicular to the ground on which the truck 1 rests in normal use, this direction thus being directed either downward, i.e., toward the ground, or upward, i.e., away from the ground. The term "horizontal" refers to a direction that is parallel to the ground and therefore perpendicular to the vertical direction. The term "front" or similar refers to the orientation of a horizontal direction, directed in the direction of forward travel of the truck 1 over the ground, while the term "rear" or similar refers to the orientation of a horizontal direction, directed in the opposite direction to the front direction. The terms "left" and "right" are defined with reference to the left and right lateral sides, respectively, of the truck 1 considered in the front direction.

As shown in FIGS. 1 to 4, the truck 1 has a driving cab 2 that is arranged at the front of the truck 1. The driving cab 2 defines a driving position for the truck 1.

The driving cab 2 comprises a chassis 10, forming a rigid framework that supports the other components of the driving cab 2 and that delimits an internal volume V2 of the driving cab 2, in which the driver of the truck 1 stands to control the driving of the truck 1. The control elements for controlling the driving of the truck 1, which are located in the internal volume V2, are not detailed here, some of them being schematically represented in FIG. 2, such as a driving wheel.

The driving cab 2 also includes a windshield 20 that can be qualified as a front windshield in the sense that it closes the front side of the internal volume V2. The specifics of the windshield 20 are not limiting as long as the windshield 20 allows the driver in the internal volume V2 to observe, through the windshield 20, the area of the space in front of the driving cab 2 and thus in front of the truck 1. In practice, the windshield 20 extends, from top to bottom, from a high cross member 11 of the chassis 10, located at the ceiling of the driving cab 2, to a low cross member 12 of the chassis 10, located at a dashboard of the driving cab 2. In addition, the windshield 20 extends, from left to right, from a left post 13 of the chassis 10 to a right post 14 of the chassis 10. Of course, as is usual in the art, the windshield 20 may not be strictly planar, but may bulge slightly forward, and may be slightly inclined from the vertical, sloping backward as the windshield 20 is considered from bottom to top.

Figure 2:
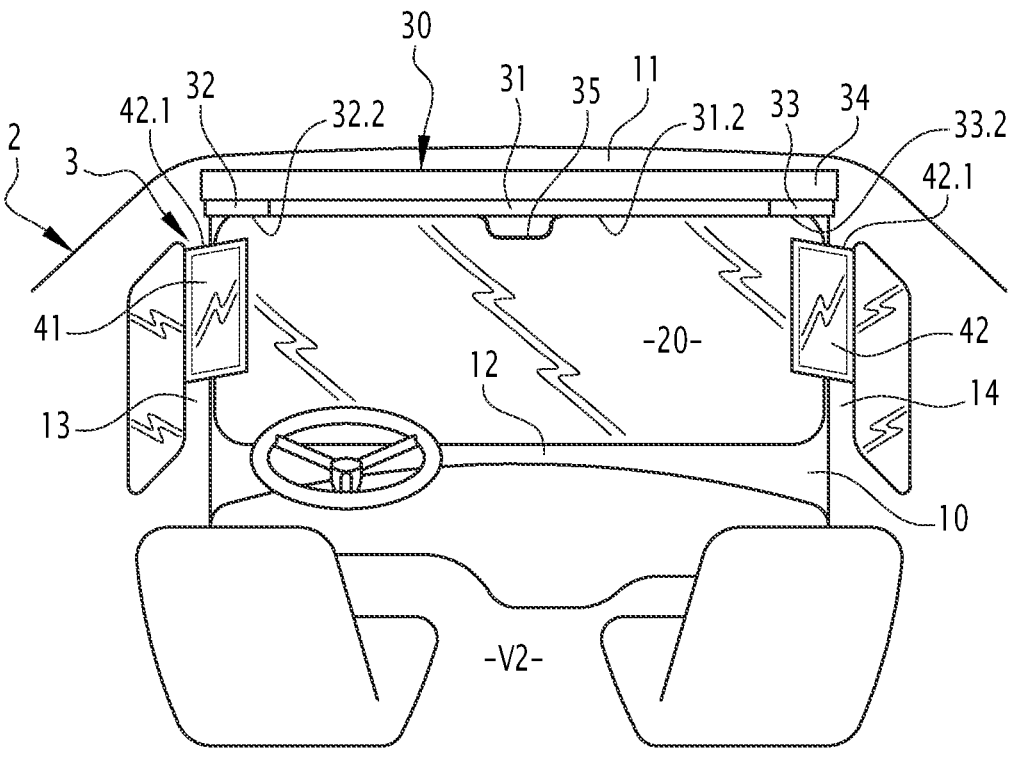
FIG. 2 is a perspective view of the interior of a driving cab of the vehicle of FIG. 1, the driving cab being equipped with a shading device that is shown in a first configuration.
Figure 3:
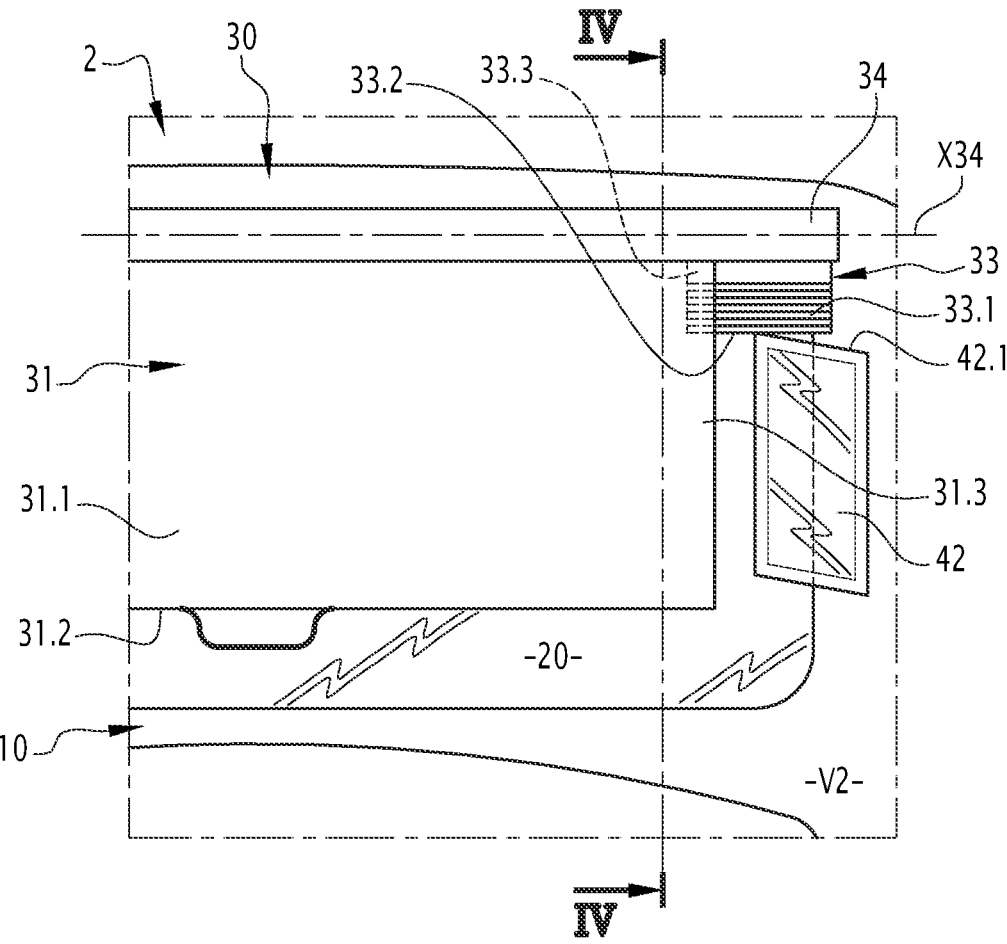
FIG. 3 is an elevation view of a portion of the interior of the driving cab of FIG. 2, with the shading device shown in a second configuration.
Figure 4:
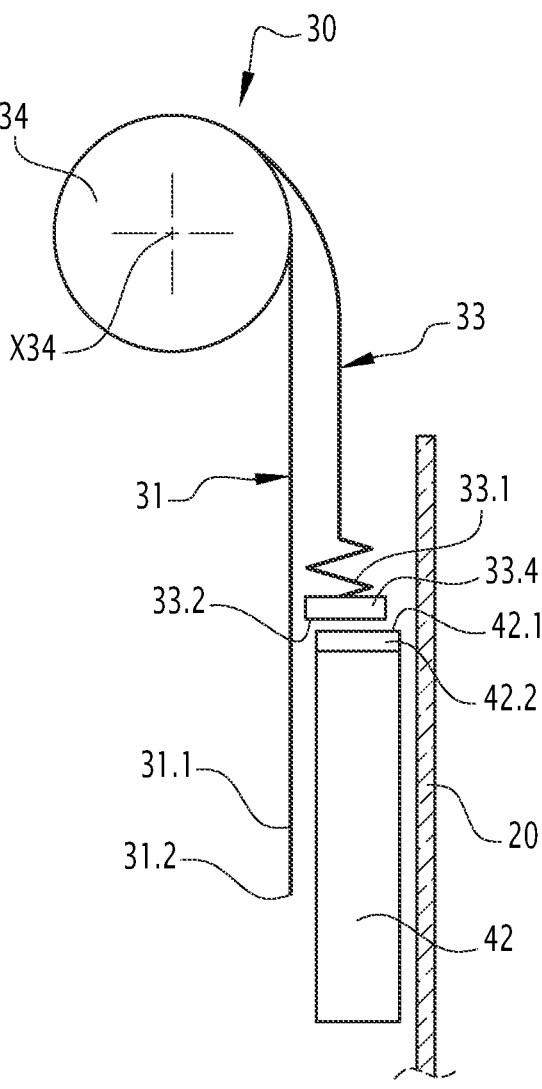
FIG. 4 is a schematic cross section along line IV-IV of FIG. 3.

As is clearly visible in FIGS. 2 to 4, the driving cab 2 also includes a shading device that shields from external light rays that pass through the windshield 20. The shading device 30 thus makes it possible to protect, among others, the driver located in the internal volume V2 from the sun's rays that could bother him or her while driving the truck 1.

Before describing the shading device 30 in more detail, we turn to another component of the truck 1, namely a camera monitoring system 3.

As can be seen in FIG. 1, this camera monitoring system 3 comprises one or more cameras 40 allowing capturing images of the outside of the driving cab 2. In practice, this camera or cameras 40 are arranged outside the driving cab 2, being carried by the driving cab 2 and/or by other parts of the truck 1. This camera or cameras 40 observe regions of the space around the truck 1, which may be only slightly or even not visible to the driver inside the driving cab 2, such as the left and right outer sides of the truck 1.

In addition, as shown in FIGS. 2 to 4, the camera monitoring system 3 also includes display screens 41 and 42 for displaying the images captured by the camera(s) 40. The display screens 41 and 42 are arranged inside the driving cab 2. The display screens 41 and 42 are respectively positioned on left and right lateral sides of the windshield 20, occupying corresponding left and right regions of the windshield 20 respectively. Hereinafter, the display screen 41 is referred to as the left display screen while the display screen 42 is referred to as the right display screen. In practice, the left display screen 41 is carried by the left post 13 of the chassis 10 while the right display screen 42 is carried by the right post 14 of the chassis 10.

Returning now to the detailed description of the shading device 30, and referring to FIGS. 2 to 4, it is noted that the shading device 30 is arranged inside the driving cab 2, i.e. in the internal volume V2.

Moreover, the shading device 30 comprises several curtains distinct from each other, namely a main curtain 31, a left side curtain 32 and a right side curtain 33. Each curtain among the main curtain 31 and the side curtains 32 and 33 is made of one or more materials allowing shading the light, so that, when the curtain covers a region of the windshield 20, more precisely a region of the inner face of the latter, the curtain stops the external light rays passing through this region of the windshield 20, inducing an effect of obscuration and thermal protection. By playing on the specificities of the material(s) constituting the curtains 31, 32 and 33, the obscuration effect and/or the thermal protection effect may be adapted.

Whatever the specificities relating to the material(s) of the curtains 31 to 33, these curtains follow one another in a horizontal direction which is perpendicular to the front direction, the main curtain 31 being located between the left side curtain 32, which faces the left side of the driving cab 2, and the right side curtain 33, which faces the right side of the driving cab 2. In addition, as clearly visible in FIGS. 2 and 3, the left display screen 41 is vertically aligned with the left side curtain 32, but offset from the main curtain 31. Similarly, the right display screen 42 is vertically aligned with the right side curtain 33, but offset from the main curtain 31. In other words, along a horizontal direction that is perpendicular to the front direction, the left display screen 41 and the left side curtain 32 occupy respective positions that, in vertical projection, overlap while the right display screen 42 and the right side curtain 33 occupy respective positions that, in vertical projection, overlap, while the display screens 41 and 42 and the main curtain 31 occupy respective positions that, in vertical projection, are disjoint.

The main curtain 31 and the side curtains 32 and 33 are distinct from each other in that they correspond to respective pieces of hardware that are different from each other and are not directly attached to each other. The main curtain 31 and the side curtains 32 and 33 are not, however, independent of each other regarding their movement within the driving cab 2, since the main curtain 31 and the side curtains 32 and 33 are carried by a common, single shaft 34 of the shading device 30. As can be seen in FIGS. 2 to 4, the shaft 34 extends lengthwise along a horizontal direction that is perpendicular to the front direction, being centered on a geometric axis X34. The shaft 34 is carried by the chassis 10, being rotatably mounted with respect to this chassis. The shaft 34 can thus rotate about its axis X34 with respect to the chassis 10, in both possible directions of rotation. The shaft 34 is arranged in height inside the driving cab 2, being arranged higher or substantially at the same vertical level as the upper edge of the windshield 20, in particular along the upper cross member 11 of the chassis 10.

The shaft 34 carries the main curtain 31 and the side curtains 32 and 33 so that these curtains 31 and 33 are each kinematically linked to the shaft 34 so as to be jointly moved along the windshield 20 selectively downwards by unwinding from the shaft 34 and upwards by winding around the shaft 34. In other words, when the shaft 34 is driven in rotation about its axis X34 in a first direction of rotation, the curtains 31 to 33 are unwound from the shaft 34 together and are thus jointly moved in displacement downwards along the windshield 20, more precisely along the inner face of this windshield; conversely, when the shaft 34 is rotated about its axis X34 in a second direction of rotation opposite to the aforementioned first direction of rotation, the curtains 31 to 33 are wound around the shaft 34 together and are thus jointly moved upwards along the inner face of the windshield 20. In practice, the joint downward and upward movements of the curtains 31 to 33 may be guided by dedicated arrangements of the shading device 30, such guiding arrangements being known per se and not being further detailed here.

The rotational drive of the shaft 34 may be motorized or manual, assisted by a spring system. In the case where the drive of the shaft 34 is motorized, the driver acts on a control member located inside the driving cab 2 to activate a motor driving the shaft 34 in rotation around its axis X34, in a direction of rotation controlled by the driver. In the case where the shaft 34 is driven manually, the driver can act on a dedicated actuating device, provided inside the driving cab 2, or directly on the main curtain 31, if necessary at a gripping handle 35 carried by the main curtain 31.

Each of the curtains 31, 32 and 33 includes:

an end portion 31.1, 32.1 and 33.1, which is unwound before the rest of the corresponding curtain when unwinding this curtain from the shaft 34 and which is wound after the rest of the corresponding curtain when winding this curtain around the shaft 34, a free edge 31.2, 32.2, 33.2, which the corresponding end portion 31.1, 32.1, 33.1 connects to the rest of the corresponding curtain and which is turned downwards when the corresponding curtain moves along the windshield 20, a left side edge, referenced 33.3 for the right side curtain 33 in FIG. 3, and a right side edge, which is referenced 31.3 for the main curtain 31 in FIG. 3.

In an advantageous optional arrangement, which is illustrated in FIG. 3, the right side edge 31.3 of the main curtain 31 and the left side edge 33.3 of the right side curtain 33 may overlap without being directly attached to each other. In this way, the main curtain 31 and the right side curtain 33 provide continuous shading between them along a horizontal direction that is perpendicular to the front direction. This optional arrangement may be similarly found between the left side edge of the main curtain 31 and the right side edge of the left side curtain 32, which thus overlap, without being directly attached to each other, to provide continuous shading between them in the aforementioned horizontal direction.

In a preferred dimensioning, related to the relative usual dimensioning of the display screens 41 and 42 and the region of the windshield 20, extending from one to the other of these display screens 41 and 42, the main curtain 31 extends, along the shaft 34, over a greater extent than the left side curtain 32 and the right side curtain 33. In other words, the main curtain 31 is wider than each of the side curtains 32 and 33, as clearly shown in FIG. 2.

The shading device 30 has arrangements to prevent the side curtains 32 and 33 from covering the display screens 41 and 42 when the curtains 31 to 33 are unrolled to such an extent that the main curtain 31 ends up lower than the display screens 41 and 42, in particular lower than respective tops 41.1 and 42.1 of the display screens 41 and 42, i.e., lower than the ends of these display screens, facing upwards. To this end, the shading device 30 is configured to change reversibly between a first configuration, which is illustrated in FIG. 2, and a second configuration, which is illustrated in FIGS. 3 and 4.

In the first configuration, the curtains 31 to 33 are entirely arranged higher than the top 41.1 of the left display screen 41 and higher than the top 42.1 of the right display screen 42. Thus, in the first configuration of the shading device 30, the free edges 31.2, 32.2 and 33.2 of the curtains 31 to 33, which may be advantageously aligned horizontally, are arranged higher than the tops 41.1 and 42.1 of the display screens 41 and 42, with the free edge 32.2 of the left side curtain 32 that is located vertically and at a distance from the top 41.1 of the left display screen while the free edge 33.2 of the right side curtain 33 is located vertically and at a distance from the top 42.1 of the right display screen 42. In the first configuration, the left side curtain 32 and the right side curtain 33 cover respective regions of the windshield 20, located vertically above the display screens 41 and 42, and the main curtain 31 covers the region of the windshield, located between the aforementioned respective regions, it being noted that the vertical extent of this covering of the windshield 20 by the curtains 31 to 33 depends on the proportion of the curtains, which is unwound from the shaft 34.

In the second configuration, a portion of the main curtain 31 is disposed lower than the top 41.1 of the left display screen 41, without the left side curtain 32 covering the left display screen 41, and lower than the top 42.1 of the display screen 42 without the right side curtain 33 covering the right display screen 42. In the second configuration, the display screens 41 and 42 thus remain visible from inside the driving cab 2, without being covered by the side curtains 32 and 33 and, more generally, by the shading device 30, while the main curtain 31 covers the region of the windshield 20, located between the display screens 41 and 42, it being noted that the vertical extent of this covering of this region of the windshield 20 depends on the proportion of the curtains 31 to 33, which is unwound from the shaft 34.

In the example of FIGS. 3 and 4, the arrangements of the shading device 30, allowing the latter to change between the first and second configurations, are related to an accordion-like shaping of the respective end portions 32.1 and 33.1 of the side curtains 32 and 33. Thus, each of the end portions 32.1 and 33.1 is accordion-shaped so as to be unfolded when the shading device is in the first configuration and to be at least partially folded on itself at the top 41.1, 42.1 of the corresponding display screen 41, 42 when the shading device 30 is in the second configuration. The structural specifics of this accordion-like shaping of the end portions 32.1 and 33.1 of the side curtains 32 and 33 are not limiting. For this purpose, each of the end portions 32.1 and 33.1 is, for example, prefolded, being made at least partially of a material that "remembers" the corresponding prefolds. In the first configuration of the shading device 30, each of the unfolded end portions 32.1 and 33.1 of the side curtains 32 and 33 behaves like the end portion 31.1 of the main curtain 31, which is not accordion-shaped. In the second configuration, the folding on itself of each of the end portions 32.1 and 33.1 of the side curtains 32 and 33 is performed at the top 41.1, 42.1 of the display screens 41 and 42 so that the side curtains 32 and 33 remain entirely above the display screens 41 and 42, the respective free edges 32.2 and 33.2 of the side curtains 32 and 33 remain against the tops 41.1 and 42.1 of the display screens 41 and 42 respectively, as illustrated for the right side curtain 33 in FIGS. 3 and 4.

In order to maintain in position the end portion 32.1, respectively 33.1, at the top 41.1, respectively 42.1, of the display screen 41, respectively 42, when the shading device 30 is in the second configuration, the end portion 32.1, respectively 33.1, may be advantageously provided with a mechanical stop which cooperates by contact with a support piece with which the display screen 41, respectively 42, is provided. Thus, in FIG. 4, this mechanical stop of the right side curtain 33 is referenced 33.4 while the corresponding support piece, with which the display screen 42 is provided, is referenced 42.2. In practice, the mechanical stop 33.4 may be advantageously arranged on the free edge 33.2 of the right side curtain 33 while the support piece 42.2 may be arranged on the top 42.1 of the right display screen 42. Similar arrangements advantageously apply for the left side curtain 32 and the left display screen 41. As a particularly convenient and effective example, the corresponding mechanical stop and support piece, such as mechanical stop 33.4 and support piece 42.2, may cooperate magnetically with each other, for example by providing that either of the mechanical stop and support piece incorporates a magnet while the other is made of a ferromagnetic material.

Figure 5:
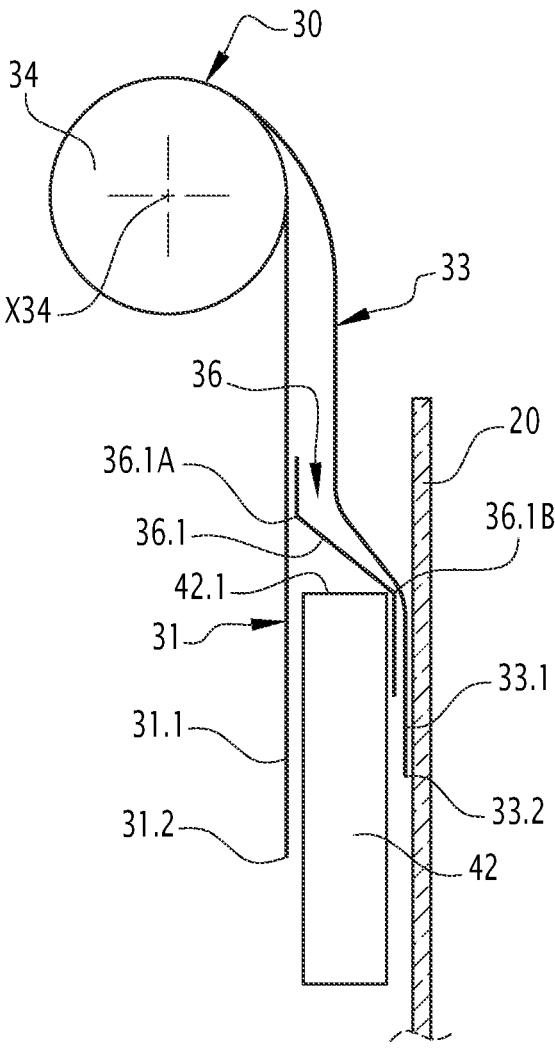
FIG. 5 is a view similar to FIG. 4, illustrating another example of a shading device.

FIG. 5 illustrates an alternative example for the arrangements of the shading device 30, which allow the shading device 30 to change between the first and second configurations. In this example in FIG. 5, the end portions 32.1 and 33.1 of the side curtains 32 and 33 are not accordion-shaped, but the shading device 30 includes, for each of the side curtains 32 and 33, a guide member that contact-guides the end portion 32.1, 33.1 of the side curtain toward backside of the corresponding display screen 41, 42 when the shading device 30 changes from the first to the second configuration. Thus, in the second configuration, the end portion 32.1, 33.1 of each of the side curtains 32 and 33 is behind the corresponding display screen 41, 42, i.e. horizontally between this display screen and the windshield 20. In FIG. 5, only the guide member associated with the right side curtain 33 is shown, being referenced 36.

As is clearly visible in FIG. 5, the guide member 36 may advantageously include a ramp 36.1 which is disposed vertically above the display screen 42 and which is inclined downwards between a first end 36.1A of the ramp 36.1, turned away from the windshield 20, and a second end 36.1B of the ramp, facing the windshield 20. This ramp 36.1 effectively guides by contact the free edge 33.2 of the right side curtain 33 until bringing this free edge 33.2 behind the right display screen 42 during the downward movement of the side curtain 33.

In practice, the guide member 36 is advantageously carried by the display screen 42, in particular at the top 42.1 of the latter.

The arrangements just described for the guide member 36 associated with the right side curtain 33 may be applicable to the guide member associated with the left side curtain 32.

According to another example, the camera monitoring system 3 comprises only one of the two display screens 41 and 42 and the shading device 30 may then comprise, in addition to the main curtain 31, only one of the two side curtains 32 and 33, namely the one vertically aligned with the display screen actually present.

Other examples are also conceivable, in particular by combining all or part of the examples described so far. Thus, according to such an example, the shading device 30 comprises two lateral curtains, one of which is arranged with an accordion-shaped end portion, such as the end portions 32.1 and 33.1 shown in FIGS. 3 and 4, while the other lateral curtain is associated with a guide member, such as the guide member 36 of FIG. 5.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A vehicle, comprising:
   a driving cab, which is arranged in front of the vehicle and which comprises:
      a chassis,
      a windshield, and
      a shading device, which is arranged inside the driving cab and which shades external light rays passing through the windshield, the shading device comprising a main curtain and a first side curtain, which are separate from each other but carried by a common shaft, rotatable relative to the chassis, and which are each kinematically linked to the shaft so as to be jointly moved along the windshield selectively downwardly by unwinding from the shaft and upwardly by winding about the shaft, and
   a camera monitoring system that includes:
      at least one camera configured to capture images of outside the driving cab, and
      a first display screen configured to display the images captured by the at least one camera, the first display screen being arranged inside the driving cab, being positioned on a first lateral side of the windshield, and being vertically aligned with the first side curtain but vertically offset from the main curtain,
      wherein the shading device is configured to change between:
         a first configuration in which the main curtain and the first side curtain are entirely disposed higher than a top of the first display screen, and
         a second configuration in which a portion of the main curtain is disposed lower than the top of the first display screen without the first side curtain covering the first display screen.

2. The vehicle of claim 1,
   wherein the first side curtain includes an end portion, which is unwound before the rest of the first side curtain when unwinding the first side curtain from the shaft and which is wound after the rest of the first side curtain when winding the first side curtain about the shaft, and wherein the end portion of the first side curtain is accordion-shaped so as to be unfolded when the shading device is in the first configuration and to be at least partially folded on itself at the top of the first display screen when the shading device is in the second configuration.

3. The vehicle of claim 2, wherein the end portion of the first side curtain is provided with a mechanical stop which cooperates by contact with a bearing piece with which the first display screen is provided so as to keep the end portion of the first side curtain in position at the top of the first display screen when the shading device is in the second configuration.

4. The vehicle of claim 3, wherein the mechanical stop and the bearing piece cooperate magnetically.

5. The vehicle of claim 1, wherein the first side curtain includes an end portion, which is unwound before the rest of the first side curtain when unwinding the first side curtain from the shaft and which is wound after the rest of the first side curtain when winding the first side curtain about the shaft, and wherein the shading device includes a first guide member that contacts and guides the end portion of the first side curtain toward a backside of the first display screen when the shading device is changed from the first to the second configuration.

6. The vehicle of claim 5, wherein the guide member includes a ramp that is disposed vertically above the first display screen and slopes downwardly between a first end of the ramp facing away from the windshield and a second end of the ramp facing the windshield.

7. The vehicle of claim 5, wherein the guide member is carried by the first display screen.

8. The vehicle of claim 1, wherein a side edge of the main curtain facing the first side curtain and a side edge of the first side curtain facing the main curtain overlap without being directly attached to each other.

9. The vehicle of claim 1, wherein the main curtain extends, along the shaft, to a greater extent than the first side curtain.

10. The vehicle of claim 1, wherein the shading device further comprises a second side curtain, which is carried by the shaft and which is kinematically linked to the shaft so as to be moved together with the main curtain and the first side curtain selectively downwardly by unwinding from the shaft and upwardly by winding about the shaft, wherein the camera monitoring system further comprises a second display screen configured to display the images captured by the at least one camera, the second display screen being arranged inside the driving cab, being positioned on a second lateral side of the windshield, and being vertically aligned with the second side curtain but offset from the main curtain, wherein when the shading device is in the first configuration, the main curtain and the first and second side curtains are entirely disposed higher than the tops of the first and second display screens, and wherein when the shading device is in the second configuration, the portion of the main curtain is disposed lower than the top of the second display screen without the second side curtain covering the second display screen.

11. The vehicle of claim 10, wherein the second side curtain includes an end portion, which is unwound before the rest of the second side curtain when unwinding the second side curtain from the shaft and which is wound after the rest of the second side curtain when winding the second side curtain about the shaft, and wherein the end portion of the second side curtain is accordion-shaped so as to be unfolded when the shading device is in the first configuration and to be at least partially folded on itself at the top of the second display screen when the shading device is in the second configuration.

12. The vehicle of claim 10, wherein the second side curtain includes an end portion, which is unwound before the rest of the second side curtain when unwinding the second side curtain from the shaft and which is wound after the rest of the second side curtain when winding the second side curtain about the shaft, and wherein the shading device includes a second guide member that contacts and guides the end portion of the second side curtain toward a backside of the second display screen when the shading device changes from the first to the second configuration.

* * * * *